G. C. BESS.
INCUBATOR.
APPLICATION FILED JULY 25, 1913.
1,105,176. Patented July 28, 1914.
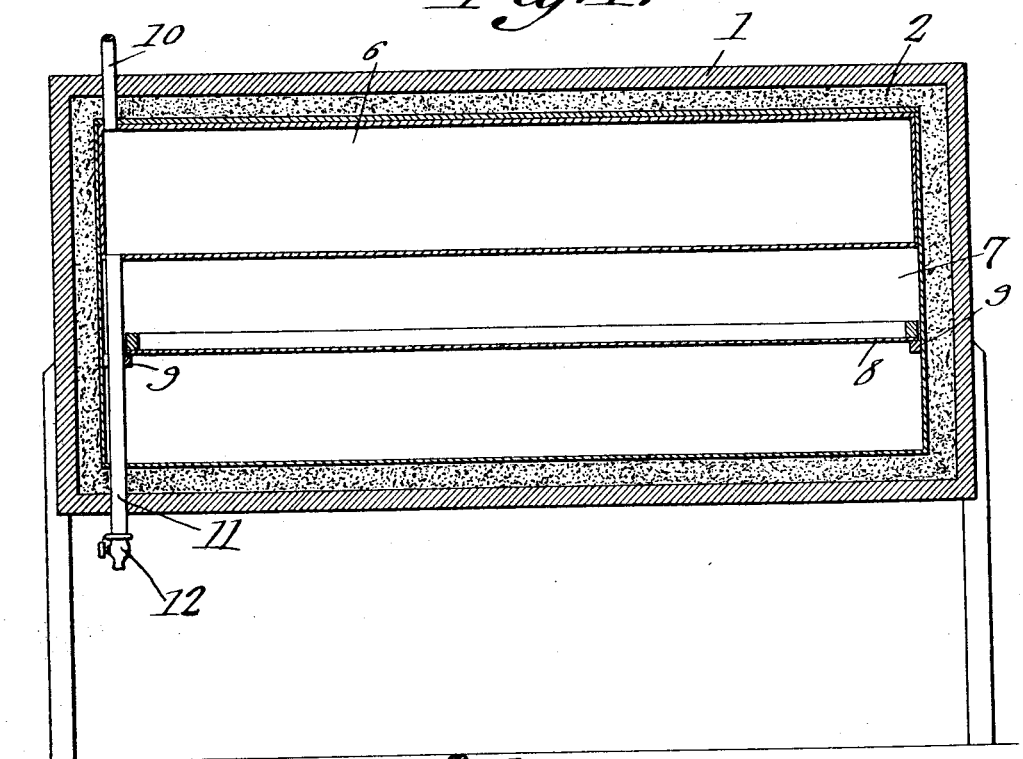
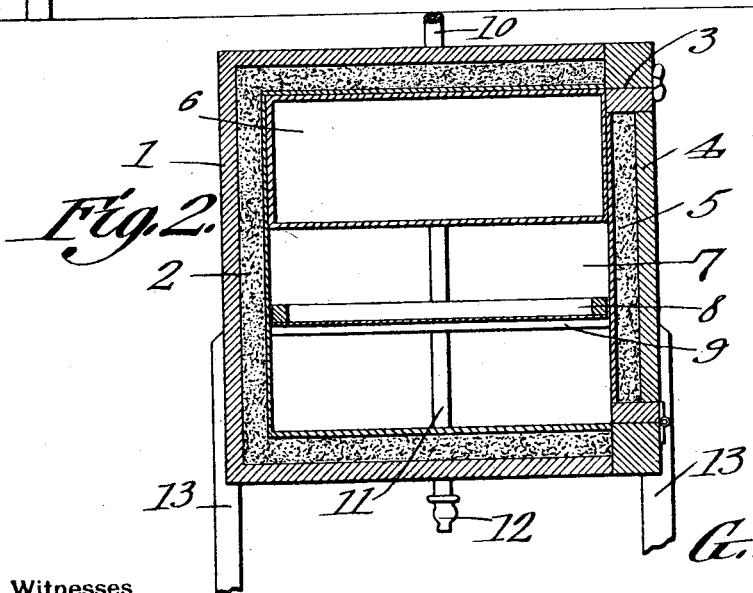
Witnesses
G. C. Bess,
Inventor
by
Attorneys

UNITED STATES PATENT OFFICE.

GROVER C. BESS, OF WAUKOMIS, OKLAHOMA, ASSIGNOR OF ONE-HALF TO ADNAH I. ISBELL, OF WAUKOMIS, OKLAHOMA.

INCUBATOR.

1,105,176. Specification of Letters Patent. Patented July 28, 1914.

Application filed July 25, 1913. Serial No. 781,274.

*To all whom it may concern:*

Be it known that I, GROVER C. BESS, a citizen of the United States, residing at Waukomis, in the county of Garfield and State of Oklahoma, have invented a new and useful Incubator, of which the following is a specification.

The present invention appertains generally to incubators, and relates more particularly to a novel fireless incubator.

It is the object of the present invention to provide a fireless incubator, embodying a hot water tank combined therewith in a unique manner for maintaining the egg chamber at incubation temperature, in order that a steady heat may be radiated from the hot water tank to the egg tray, and in order to safeguard against accidents.

The invention has been illustrated in its preferred embodiment in the accompanying drawing, wherein:—

Figure 1 is a longitudinal section of the improved incubator. Fig. 2 is a cross section thereof.

In carrying out the present invention, there is provided a double walled case 1, preferably constructed of asbestos boards, or other material having sufficient heat resisting qualities. Sawdust 2 is packed between the walls of the case 1, in order that the penetration of heat through the case, will be effectively reduced to a minimum or nullity.

One side of the case 1 is provided with a door opening 3 extending between the top and bottom of the case, which is, normally closed by a double walled door 4 hinged to the lower edge of the door opening 3, and having the sawdust packing 5 between the walls thereof, whereby the door, as well as the case, will have the requisite insulating properties.

A water tank 6 is disposed snugly within and completely fills the upper portion of the interior of the case 1, and rests against the top of the case, and provides an egg chamber 7 therein under. A suitable egg tray 8 is mounted within the egg chamber 7, at a proper distance below the bottom of the water tank 6, the tray 8 being preferably supported on cleats 9 secured to the ends of the case. The interior walls of the case are unencumbered or smooth above the tray, as is clearly apparent from the figures.

The top of the tank 6 is provided with an upstanding straight inlet tube 10 adjoining one end, and with a depending straight discharge outlet tube 11 at the said end, the respective tubes 10 and 11 passing through the top and bottom of the case, and the lower end of the outlet tube 11 being equipped with a pet cock 12 below the bottom of the case.

In use, the eggs are placed on the egg tray 8 as usual, and water heated to incubation temperature, is poured into the tank 6 through the inlet or filling tube 10. Then, after the door 4 has been closed, the latent heat of the heated water will be radiated fro mthe bottom of the tank toward the egg tray, to assist in the incubation of the eggs. At certain intervals, the water is partially or completely drained from the tank 6, by opening the pet cock 12, and the supply of heated water within the tank is replenished, by pouring freshly heated water into the inlet tube or nozzle 10. The intermittent drawing off of the waer from and filling from the bottom of the tank toward the egg have hatched, it being observed that the present device entirely eliminates the usual lamp or other burner embodying a flame, which is more or less unsafe. Furthermore, the heat radiated from the bottom of the water tank, will be uniform or practically so, during the operation of the incubator, in order to accomplish the best results.

What is claimed is:—

An incubator embodying a case, one side of which has a door extending between the top and bottom of the case, a water tank fitting snugly within the upper portion of the interior of the case, an egg tray supported in the case below the tank, the interior walls of the case being unencumbered above the tray, the top and bottom of the tank having straight upstanding and depending inlet and outlet tubes, respectively, at one end, the said tubes passing through the top and the bottom of the case, respectively, and a pet cock attached to the lower end of the outlet tube below the bottom of the case.

In testimony that I claim the foregoing as my own, I have hereto affixed my signature in the presence of two witnesses.

GROVER C. BESS.

Witnesses:
E. A. PENDARVIS,
LOUIS W. GREEN.

Copies of this patent may be obtained for five cents each, by addressing the "Commissioner of Patents, Washington, D. C."